（12）United States Patent
Keski-Valkama (10) Patent No.: US 11,314,517 B2
(45) Date of Patent: Apr. 26, 2022

(54) METHOD AND APPARATUS FOR UPDATING PIPELINE OPERATIONS FOR DATA PROCESSING

(71) Applicant: HERE Global B.V., Eindhoven (NL)

(72) Inventor: Tero Juhani Keski-Valkama, Zurich (CH)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 16/441,211

(22) Filed: Jun. 14, 2019

(65) Prior Publication Data

US 2020/0394044 A1 Dec. 17, 2020

(51) Int. Cl.
*G06F 9/38* (2018.01)
*G06N 20/00* (2019.01)

(52) U.S. Cl.
CPC .......... *G06F 9/3857* (2013.01); *G06F 9/3869* (2013.01); *G06F 9/3885* (2013.01); *G06N 20/00* (2019.01)

(58) Field of Classification Search
CPC ................................................... G06F 9/3857
See application file for complete search history.

(56) References Cited

U.S. PATENT DOCUMENTS

| 10,111,043 | B1 * | 10/2018 | Cirit | H04W 4/023 |
| 10,671,068 | B1 * | 6/2020 | Xu | G05D 1/0212 |
| 2015/0235143 | A1 | 8/2015 | Eder | |
| 2017/0011306 | A1 | 1/2017 | Kim et al. | |
| 2017/0063908 | A1 | 3/2017 | Muddu et al. | |
| 2018/0330238 | A1 | 11/2018 | Luciw et al. | |

OTHER PUBLICATIONS

Baylor, D. et al., *TFX: A TensorFlow-Based Production-Scale Machine Learning Platform*, KDD 2017 Applied Data Science Paper (Aug. 2017) 1387-1395.
Using Artificial Intelligence to Boost Agile/DevOps Efficiency [online] [retrieved Feb. 1, 2019]. Retrieved from the Internet: <https://content.intland.com/blog/using-artificial-intelligence-to-boost-agile/devops-efficiency>, (2018) 4 pages.
Continuous Intelligence: Moving Machine Learning into Production Reliably: Big data conference & machine learning training | Strata . . . [online] [retrieved Feb. 4, 2019], Retrieved from the Internet: <https://conferences.oreilly.com/strata/strata-eu/public/schedule/detail/74035>, (2019) 4 pages.

* cited by examiner

*Primary Examiner* — Keith E Vicary
(74) *Attorney, Agent, or Firm* — Alston & Bird LLP (57) ABSTRACT

Methods described herein relate to updating pipeline operations for data processing. The method includes receiving pipeline information for at least one of a plurality of pipelines. The pipeline information includes at least one of an input dataset, output dataset, input model, intermediate model, or output model. The method also includes determining one or more of the plurality of pipelines to update based on similarities with the pipeline information received for at least one of the plurality of pipelines. The method further includes updating the one or more of the plurality of pipelines based on the pipeline information received. Updating the pipeline includes updating at least one of the input model, intermediate model, or output model. The method still further includes storing the one or more updated pipelines.

20 Claims, 3 Drawing Sheets

METHOD AND APPARATUS FOR UPDATING PIPELINE OPERATIONS FOR DATA PROCESSING

TECHNOLOGICAL FIELD

Example embodiments of the present invention relate generally to using machine learning for data processing, and more particularly, to using machine learning for creating shared pipelines for data processing.

BACKGROUND

Some current data processing pipelines are defined and set up in a continuous deployment environment in which newly updated input datasets automatically launch re-trainings of all the related models and after training those models are tested and automatically deployed to process pipelines in testing environments or in production. Such current data processing pipelines use independent pipelines for training and deployment.

Domain knowledge transfer, such as transfer learning and multitask learning are widely used in artificial neural networks and in reinforcement learning. Transfer learning and multitask learning improve the model performance. However, transfer learning is generally not incorporated into a continuous deployment data processing pipeline environment since the independent pipelines make transfer learning more difficult.

BRIEF SUMMARY

Accordingly, a method, apparatus, and computer program product are provided for creating and/or updating shared pipelines for data processing. In an example embodiment, a method is provided for updating pipeline operations for data processing. The method includes receiving pipeline information for at least one of a plurality of pipelines. The pipeline information includes at least one of an input dataset, output dataset, input model, intermediate model, or output model. The method also includes determining one or more of the plurality of pipelines to update based on similarities with the pipeline information received for at least one of the plurality of pipelines. The method further includes updating the one or more of the plurality of pipelines to update based on the pipeline information received. Updating the pipeline includes updating at least one of the input model, intermediate model, or output model. The method still further includes storing the one or more updated pipelines.

In some embodiments, the updated pipelines are stored in persistent storage. In some embodiments, the similarities with the pipeline information is based on at least one of the same input dataset, output dataset, input model, intermediate model, or output model. In some embodiments, determining the one or more of the plurality of pipelines to update based on similarities with the pipeline information further includes compiling a transitive set based on at least one connected input dataset, output dataset, input model, intermediate model, or output model.

In some embodiments, the transitive set includes at least two pipelines based on a previous update. In some embodiments, the pipelines determined to be updated include the pipelines in the transitive set. In some embodiments, the pipeline information is received automatically based on an observed change to one or more pipelines.

In another example embodiment, an apparatus is provided for updating pipeline operations for data processing with at least one processor and at least one non-transitory memory including computer program code instructions, the computer program code instructions configured to, when executed, cause the apparatus to receive pipeline information for at least one of a plurality of pipelines. The pipeline information includes at least one of an input dataset, output dataset, input model, intermediate model, or output model. The computer program code instructions are also configured to, when executed by the at least one processor, cause the apparatus to determine one or more of the plurality of pipelines to update based on similarities with the pipeline information received for at least one of the plurality of pipelines. The computer program code instructions are further configured to, when executed by the at least one processor, cause the apparatus to update the one or more of the plurality of pipelines based on the pipeline information received. Updating the pipeline includes updating at least one of the input model, intermediate model, or output model. The computer program code instructions are still further configured to, when executed by the at least one processor, cause the apparatus to store the one or more updated pipelines.

In some embodiments, the updated pipelines are stored in persistent storage. In some embodiments, the similarities with the pipeline information are based on at least one of the same input dataset, output dataset, input model, intermediate model, or output model. In some embodiments, determining the one or more of the plurality of pipelines to update based on similarities with the pipeline information also includes compiling a transitive set based at least one connected input dataset, output dataset, input model, intermediate model, or output model.

In some embodiments, the transitive set includes at least two pipelines based on a previous update. In some embodiments, the pipelines determined to be updated include the pipelines in the transitive set. In some embodiments, the pipeline information is received automatically based on an observed change to one or more pipelines.

In still another example embodiment, a computer program product is provided with at least one non-transitory computer-readable storage medium having computer-executable program code portions stored therein, the computer-executable program code portions comprising program code instructions configured to receive pipeline information for at least one of a plurality of pipelines. The pipeline information includes at least one of an input dataset, output dataset, input model, intermediate model, or output model. The computer program instructions are also configured to determine one or more of the plurality of pipelines to update based on similarities with the pipeline information received for at least one of the plurality of pipelines. The computer program instructions are further configured to update the one or more of the plurality of pipelines based on the pipeline information received. Updating the pipeline includes updating at least one of the input model, intermediate model, or output model. The computer program instructions are still further configured to store the one or more updated pipelines.

In some embodiments, the similarities with the pipeline information are based on at least one of the same input dataset, output dataset, input model, intermediate model, or output model. In some embodiments, determining the one or more of the plurality of pipelines to update based on similarities with the pipeline information further includes compiling a transitive set based on at least one connected input dataset, output dataset, input model, intermediate model, or output model. In some embodiments, the transitive set includes at least two pipelines based on a previous update. In some embodiments, the pipelines determined to be updated include the pipelines in the transitive set. In some embodiments, the pipeline information is received automatically based on an observed change to one or more pipelines.

In another example embodiment, an apparatus is provided for updating pipeline operations for data processing. The apparatus includes means for receiving pipeline information for at least one of a plurality of pipelines. The pipeline information includes at least one of an input dataset, output dataset, input model, intermediate model, or output model. The apparatus also includes means for determining one or more of the plurality of pipelines to update based on similarities with the pipeline information received for at least one of the plurality of pipelines. The apparatus further includes means for updating the one or more of the plurality of pipelines to update based on the pipeline information received. Updating the pipeline includes updating at least one of the input model, intermediate model, or output model. The apparatus still further includes means for storing the one or more updated pipelines.

In some embodiments, the updated pipelines are stored in persistent storage. In some embodiments, the similarities with the pipeline information is based on at least one of the same input dataset, output dataset, input model, intermediate model, or output model. In some embodiments, determining the one or more of the plurality of pipelines to update based on similarities with the pipeline information further includes compiling a transitive set based on at least one connected input dataset, output dataset, input model, intermediate model, or output model.

In some embodiments, the transitive set includes at least two pipelines based on a previous update. In some embodiments, the pipelines determined to be updated include the pipelines in the transitive set. In some embodiments, the pipeline information is received automatically based on an observed change to one or more pipelines.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having thus described certain example embodiments of the present invention in general terms, reference will hereinafter be made to the accompanying drawings which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment of the present disclosure for improving machine learning through data pipeline integration. Conventional techniques of connecting data inputs to data outputs during data processing use independent pipelines. The independent pipelines prevent, in most cases, the use of machine learning based on other pipelines; however, the pipelines that receive different, but similar inputs often use similar operations to determine an output that may be useful in improving data processing. In order to allow for the integration of independent machine learning pipelines, the method, apparatus and computer program product define new shared pipelines using shared model modules in the continuous deployment data processing. These shared pipelines are updated and evolved regularly, both in training and in final deployment. These modules enable an orchestrated training of all the related models together end-to-end by the continuous deployment system, so that the use cases of related pipelines shares parts of the models, thus leveraging transfer learning across multiple tasks.

Figure 1:
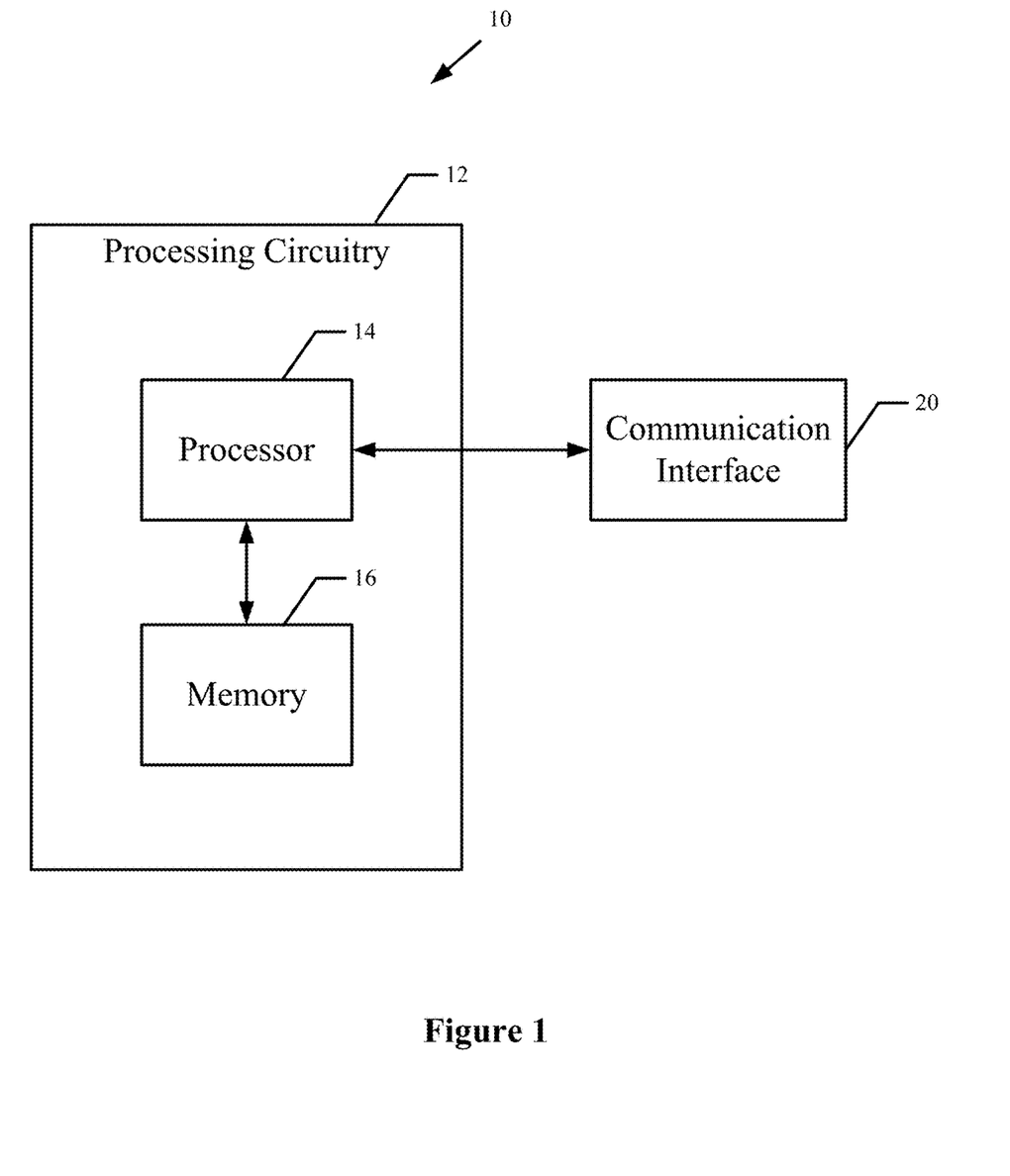
FIG. 1 is a block diagram of an apparatus according to an example embodiment of the present disclosure.

FIG. 1 is a schematic diagram of an example apparatus configured for performing some of the operations described herein, particularly the gathering of training data processing pipelines based on semantic similarity of data and labels. The apparatus 10 may include, be associated with, or may otherwise be in communication with a processing circuitry 12, such as a processor 14 and a memory device 16; and a communication interface 20. In some embodiments, the processor 14 (and/or co-processors or any other processing circuitry assisting or otherwise associated with the processor) may be in communication with the memory device 16 via a bus for passing information among components of the apparatus. The memory device 16 may be non-transitory and may include, for example, one or more volatile and/or non-volatile memories. In other words, for example, the memory device 16 may be an electronic storage device (for example, a computer readable storage medium) comprising gates configured to store data (for example, bits) that may be retrievable by a machine (for example, a computing device such as the processor 14). The memory device 16 may be configured to store information, data, content, applications, instructions, or the like for enabling the apparatus 10 to carry out various functions in accordance with an example embodiment of the present invention. For example, the memory device 16 could be configured to buffer input data for processing by the processor 14. Additionally or alternatively, the memory device 16 could be configured to store instructions for execution by the processor 14.

The processor 14 may be embodied in a number of different ways. For example, the processor 14 may be embodied as one or more of various hardware processing means such as a coprocessor, a microprocessor, a controller, a graphics processing unit (GPU), a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 14 may include one or more processing cores configured to perform independently. A multi-core processor may enable multiprocessing within a single physical package. Additionally or alternatively, the processor 14 may include one or more processors configured in tandem via the bus to enable independent execution of instructions, pipelining and/or multithreading.

In an example embodiment, the processor 14 may be configured to execute instructions stored in the memory device 16 or otherwise accessible to the processor. Alternatively or additionally, the processor 14 may be configured to execute hard-coded functionality. As such, whether configured by hardware or software methods, or by a combination thereof, the processor 14 may represent an entity (for example, physically embodied in circuitry) capable of performing operations according to an embodiment of the present invention while configured accordingly. Thus, for example, when the processor 14 is embodied as an ASIC, FPGA or the like, the processor 14 may be specifically configured hardware for conducting the operations described herein. Alternatively, as another example, when the processor 14 is embodied as an executor of software instructions, the instructions may specifically configure the processor to perform the algorithms and/or operations described herein when the instructions are executed. However, in some cases, the processor 14 may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In some embodiments, the processor 14 may be configured to use machine learning or other operations described herein.

The apparatus 10 of an example embodiment may also include a communication interface 20 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 20 may be configured to communicate over Global System for Mobile Communications (GSM), such as but not limited to Long Term Evolution (LTE). In this regard, the communication interface 20 may include, for example, an antenna (or multiple antennas) and supporting hardware and/or software for enabling communications with a wireless communication network. Additionally or alternatively, the communication interface 20 may include the circuitry for interacting with the antenna(s) to cause transmission of signals via the antenna(s) or to handle receipt of signals received via the antenna(s). In some environments, the communication interface 20 may alternatively or also support wired communication and/or infrastructure wireless links. The communication interface 20 may be configured to communicate, through various methods described herein, with one or more sensors, user devices (e.g., mobile devices, computers, or the like), and/or the like.

Apparatus 10 may be in communication with a plurality of different data processing pipelines configured to process data in a predefined sequence of data processing operations taking an input and resulting in an output through the use of models. Various inputs can produce multiple outputs, while various outputs may be the product of multiple inputs. Training data including a plurality of different objects in a plurality of different environmental conditions and contexts may provide a large degree of diversity from which a pipeline may be trained. Embodiments described herein ensure that a training data set is sufficiently diverse through sampling in different pipelines through shared models. Such shared models may be hand-crafted, shared across code-bases of applications, and/or generated automatically based on heuristic rules, or a neural architecture search. User-defined heuristics to define pipeline interconnectivity allow for a more precisely defined transfer learning and allow for identification of intermediate models with descriptive names. Embodiments provided herein disclose an automated approach to dataset use case connection and model sharing in an online manner as the neural network for a pipeline is being trained. Additionally, a shared pipeline, as discussed herein, refers to a pipeline configured to take one or more inputs with one or more common processing model (e.g., input model, intermediate model, and/or output model) to produce one or more outputs applicable for these inputs and models. In various embodiments, a shared pipeline may be a common pipeline used by one or more similar inputs to determine one or more similar outputs.

Embodiments of the present disclosure provide a method to automatically learn feature spaces, as defined by the neural network, as well as to identify the applicable training examples. The shared feature spaces of the present disclosure allow the different neural networks for different use cases to utilize the same intermediate models trained with training datasets with a potentially wider coverage than singular data and labels associated with the specific use case alone. Sharing feature spaces between different, but similar data and labels creates positive transfer between the models, synergistically improving the model's recognition performance. Transfer learning in this context also allows smaller datasets to be used for each use case as the smaller datasets can benefit from larger datasets of other use cases. This integration can allow substantial savings in manual labor and labeling costs, and also in training time for new perception stacks.

The artificial intelligence (AI) and machine learning employed according to certain example embodiments described herein will now be described. Machine learning is often used to develop a particular pattern recognition algorithm (e.g., an algorithm that represents a particular pattern recognition problem, such as the determination of shared pipelines herein) that is based on statistical inference. In some embodiments, the apparatus 10, such as the processing circuitry 12, the processor 14 or the like, receives large quantities of data (e.g., inputs and outputs) from a variety of sources relating to data processing pipelines and determines whether the data processing pipelines have similarities.

For example, a shared pipeline may be generated by the apparatus 10, such as the processing circuitry 12, the processor 14 or the like, using unsupervised learning, in which the shared pipelines is based on calculations of similarity of features of the patterns within a previously collected training set of patterns. In some embodiments, unsupervised models may be used as parts of shared pipelines in the sense that the unsupervised models can learn meaningful, shared intermediate representations which can create positive transfer for other use cases. In another example, a classifier representing a particular categorization problem may be developed by the apparatus 10, such as the processing circuitry 12, the processor 14 or the like, using supervised learning based on using a training set of patterns and their respective known categorizations. Each training pattern is input to the classifier, and the difference between the output categorization generated by the classifier and the known categorization is used to adjust the classifier coefficients to more accurately represent the problem. A classifier that is developed using supervised learning also is known as a trainable classifier. In various embodiments, supervised learning between different neural networks sharing parts and intermediate representations allows for positive transfer between different use cases.

Using unsupervised, reinforcement learning and supervised machine learning models for the same shared feature spaces require that the training processes between these models are substantially similar and progressive, for example, utilization of stochastic gradient descent in conjunction with the training processes, and that they can exert comparable influence to the intermediate representations between each other. In some embodiments, these kinds of hybrid intermediate representations may need to be balanced carefully to prevent one use case from dominating the representations of others. In some embodiments using multiple different kinds of learning algorithms on the shared models may make it significantly more likely that these algorithms might have significant differences in relative power. In some embodiments, the balancing of objectives can be done manually and/or using automated techniques, such as multi-objective optimization between the different co-trained, model-sharing use cases, such that none of the use cases can overpower the other use cases hampering the optimal performance of the other use cases.

In some embodiments, the apparatus 10, such as the processing circuitry 12, the processor 14 or the like, is configured to perform content analysis, which includes a source-specific classifier that takes a source-specific representation of the content received from a particular source as an input and produces an output that categorizes that input as being likely to include a relevant data reference or as being unlikely to include a relevant data reference (e.g., likely or unlikely to meet the required criteria). In some embodiments, the source-specific classifier is a trainable classifier that can be optimized as more instances of content for analysis are received from a particular source.

In some embodiments, the AI and models described herein use "deep learning". Deep learning is a subset of machine learning that generates models based on training data sets that have been provided. In some embodiments, the models may use unsupervised learning techniques like generative adversarial networks, or variational auto-encoders which have a loss or an objective function. In some embodiments, the models may also use reinforcement learning methods, such as where the objective is to maximize the reward. In some embodiments, the models may also use supervised learning methods, for example feed-forward neural networks where the input data is mapped to target labels. In general, these different methods can share intermediate models as long as the intermediate models are trained iteratively, the intermediate models have internal representations which create positive transfer benefit between tasks, and the respective objectives of the intermediate models can be balanced manually or using multi-objective optimization techniques to allow each use case to achieve good performance and benefit from the positive transfer.

Figure 2:
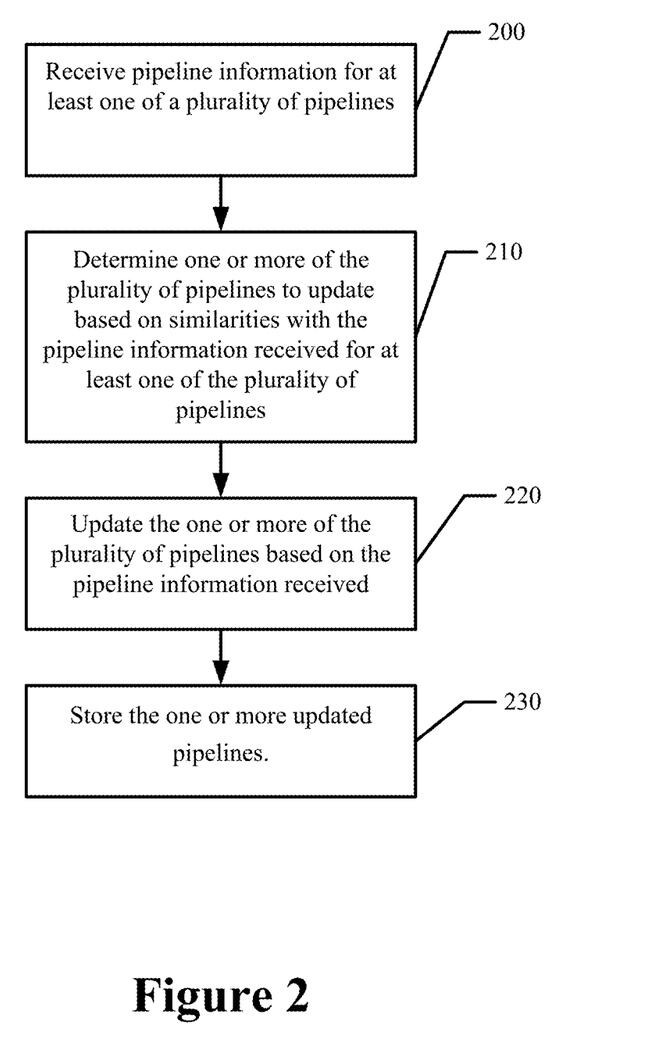
FIG. 2 is a flowchart illustrating the operations of an example embodiment in accordance with the present disclosure.

FIG. 2 illustrates a flowchart of the operations of an apparatus, such as the apparatus 10 shown in FIG. 1, for creating, updating, and triggering the training for shared pipelines for use cases in accordance with an example embodiment of the present disclosure. Referring now to Block 200 of FIG. 2, the apparatus includes means, such as the processing circuitry 12, the processor 14, or the like, for receiving pipeline information for at least one of a plurality of pipelines. In some embodiments, the pipeline information includes at least one of input dataset, output dataset, input model, intermediate model, or output model. In some embodiments, the pipeline information consists of definitions and identifiers of input datasets, input models, intermediate models, output models and optional output label data. In some embodiments, the input information, which may define associated pipelines, may be stored in the apparatus (e.g., a version control system stored on a memory device 16). The apparatus 10 executing the continuous deployment environment may be activated based on automatically observed changes to the pipeline definitions, any referred data, any referred models, or the like.

In some embodiments, the machine learning model implementations may be stored in the apparatus (e.g., the version control system stored on a memory device 16), such as program code (e.g., Python). In such an embodiment, the different model parts, that is, the input models, the intermediate models and the output models may be fetched by the processing circuitry 12, such as the processor 14 as referred to in the pipeline definitions, and combined together to form pipelines from inputs to outputs, to execute the training. In some embodiments, the trained models may be stored either by the apparatus 10, such as in the memory device 16, or externally.

Figure 3:
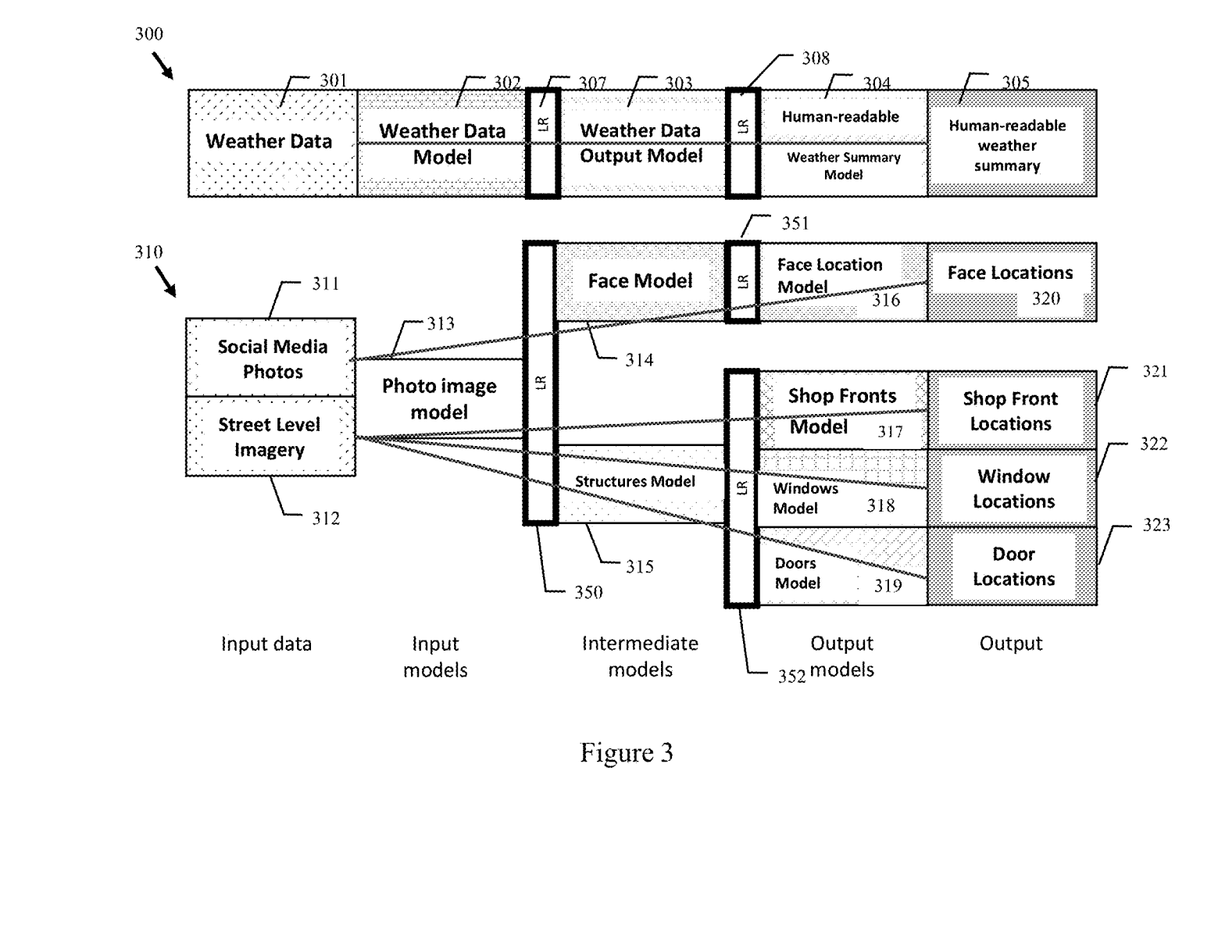
FIG. 3 illustrates a pipeline network showing both an individual pipeline and a shared pipeline in accordance with an example embodiment of the present disclosure.

In some embodiments, pipeline information relating to the input datasets (301,311,312) may include source information, data format, data category, and/or the like. In some embodiments, pipeline information relating to the input models (302,313) may include the references to the program code implementing the input model mapping from the input data (201,311,312) to latent representation (307,350). In some embodiments, pipeline information relating to the input models may also include the name or the identifier of the input model, which identifies the input data category.

In some embodiments, pipeline information relating to the intermediate models (303,314,315) may include the references to the program code implementing the intermediate model mapping from an input side latent representation (307,350) to an output side latent representation (308,351,352). In some embodiments, pipeline information relating to the intermediate models may also include the name or the identifier of the intermediate model. In some embodiments, pipeline information relating to the output models (304,316,317,318,310) may include the references to the program code implementing the output model mapping from a latent representation (308,351,352) to outputs (305,320,321,322,323) which may be labels for supervised learning, or related outputs of unsupervised or reinforcement learning use cases. In some embodiments, pipeline information relating to the output model may also include the name or the identifier of the output model which identifies the output category. In some embodiments, pipeline information relating to the outputs (305,320,321,322,323) may include source information, data format, data category and/or the like. In some embodiments, the pipeline information defines one or more pipelines, each forming a separate use case, which may be composed from the shared parts including, potentially, the input data, input models, intermediate models, output models, and/or output data.

Referring now to Block 210 of FIG. 2, the apparatus 10 includes means, such as the processing circuitry 12, the processor 14, or the like, for determining one or more of the plurality of pipelines to update based on similarities with the pipeline information received for at least one of the plurality of pipelines. In some embodiments, the apparatus 10, such as the processing circuitry 12, may collect a transitive set of pipelines affected by a given change. For example, for every input dataset changed, every directly connected input model is collected to a transitive set and, for every output dataset changed, every directly connected output model is collected to the same or different transitive set. For every changed input, intermediate or output model, and for every input, intermediate or output model collected into a transitive set, and every directly connected input, intermediate and output model may also be collected into a transitive set. In some embodiments, the apparatus 10, such as the processing circuitry 12, may use the transitive set to determine similar pipelines. For example, a transitive set may include all the use case pipelines to be retrained together including all associated models. In some embodiments, various input dataset(s), output dataset(s), input model(s), intermediate model(s), and/or output model(s) may be included in the same transitive set. In some embodiments, the determination of pipelines to update may be based on the transitive set.

Alternatively, the apparatus 10, such as the processing circuitry 12, may be configured such that the input models and/or output models are not retrained unless their model program code or attached input or output dataset changes. In such a case, any input dataset change may trigger the directly connected input model to be collected to a transitive set, and every output dataset change may trigger the respective output model to be collected into the transitive set. In some embodiments, the addition of any input, intermediate or output model to a transitive set, or changes to any input, intermediate or output model program code, may add those models and any directly connected intermediate models to a transitive set.

Referring now to Block 230 of FIG. 2, the apparatus 10 includes means, such as the processing circuitry 12, the processor 14, or the like, for updating the one or more of the plurality of pipelines based on the pipeline information received. In some embodiments, updating the pipeline includes updating at least one of the input model, intermediate model, or output model. In some embodiments, the apparatus 10 may include means, such as the processing circuitry 12, the processor 14, or the like, for executing the training procedures step by step for a set of pipelines consisting of program code of input, intermediate and output models, and their respective input and optional output datasets. In some embodiments, the training process may be initialized by retrieving potentially pretrained model parameters for any input, intermediate, or output models in a transitive set. In an instance that the pretrained existing model parameters are not available, the parameters may be initialized, for example, with model specific random initialization.

In an example embodiment, the final transitive which resulted from Block 210 of FIG. 2 may be trained by training all use case pipelines that include one or more of the modules in a transitive set such that the models which are in the respective pipelines, but not in the transitive set may be kept static. In some embodiments, two or more pipelines may be trained together in an interlaced fashion to make their shared models learn from multiple tasks without catastrophic forgetting. In some embodiments, the pipelines trained together may be trained simply by optimizing the joint loss or objective functions, or multi-objective optimization methods may be used.

In some embodiment, the portion of the apparatus, such as the processing circuitry 12, configured to adjust the parameters of the models may be stopped at the limits of those modules which are not included in the transitive set, but which are needed for the pipelines to be trained.

Referring now to Block 230 of FIG. 2, the apparatus 10 includes means, such as the processing circuitry 12, the memory device 16, or the like, for storing the one or more updated pipelines. In some embodiments, the apparatus 10 includes means, such as the processing circuitry 12, the processor 14, or the like, for storing the trained model parameters to a persistent storage, for example a version control repository. In some embodiments, the stored models may be used in subsequent iterations of related training processes in Block 220 and the rest of FIG. 2. Additionally, the process may optionally also store training diagnostic and performance indicators for review purposes.

Referring to FIG. 3, a possible realization of the present disclosure is shown illustrating the operations of various use cases. In this example, the use cases inputs and outputs are Weather data to Human-readable weather summary, Social media photos to Face locations, Street-level imagery to Shop front locations, Street-level imagery to Window locations, and Street-level imagery to Door locations.

As shown, FIG. 3 provides an example embodiment of one possible pipeline configuration for five use case pipelines, such that the use cases may benefit from positive transfer between learning of different tasks in a continuous deployment environment. FIG. 3 is just one example to describe how practical use case pipelines in general would be updated and configured in the described method and is not meant to be exhaustive.

In the example embodiment shown in FIG. 3, two internal, latent representations may be needed for each use case, one to describe content in certain similar kinds of input, that is, the input side latent representations, and the output side latent representations to describe information needed for certain kinds of outputs. The input, intermediate and output models map these representations through the use case pipeline, and bridge them together across different pipelines.

The input models 302, 313 map input representations 301, 311, 312 to input side latent representations 307, 350 which may filter out information and noise irrelevant to any of the target use case pipelines through training. The input models may bridge together similar input formats.

The intermediate models 303, 314, 315 map input side latent representations into output side latent representations which can bridge together different kinds of outputs or use cases. The purpose of the intermediate models is on the other hand to bridge together use case pipelines which may exhibit positive transfer between each other, and on the other hand, separate use case pipelines which would exhibit negative transfer, that is a conflict in learning which decreases the performance of both use cases.

The output models as exemplified in a descriptive example in FIG. 3, blocks 304, 316, 317, 318 and 319 map the output side latent representations 308, 351 and 352 into outputs 305, 320, 321, 322 and 323. In some embodiments, the shared pipeline 310 may be updated to include different inputs, outputs, and/or models associated with the shared pipeline. For example, the processing circuitry 12, e.g., the processor 14, may determine that another source of photos uses the photo image model and therefore can share the latent representation 350, yet also uses different intermediate models and/or output models and therefore the shared pipeline 310 may be expanded to include multiple intermediate models and/or output models based on similar inputs. In some embodiments, a shared pipeline (e.g., shared pipeline 310) may be updated based on machine learning. For example, the apparatus, such as the processing circuitry 12, the processor 14, or the like, includes means for determining similarities between different inputs and outputs, such that the pipelines may be combined to generate a shared pipeline. Additionally, machine learning may be used to determine the efficiency and/or accuracy of a shared pipeline. In some embodiments, manual quality checking may be used to update a shared pipeline.

In some embodiments, the continuous deployment apparatus may try out different variations of the architecture, to connect existing intermediate models to new inputs and outputs, or to separate existing pipelines by cloning an intermediate model to two or more intermediate models both connected to some non-overlapping subsets of original inputs or outputs, without cutting off an existing use-case pipeline. The apparatus 10 may retrain everything and measure target performance indicators to determine whether the change allowed the system to benefit from more positive transfer between the different use case pipelines, or reduce negative transfer between the different use case pipelines. In some embodiments, the apparatus 10 may continue to use the better alternative of the tested alternatives and continue varying the architecture using normal optimization methods. In some embodiments, the variation may or may not include gradual changes to the internal neural architectures of the models. In addition, or alternatively, to using machine optimized pipelines, the pipeline decomposition and recomposition may be manually defined, such as by software engineers designing the use case pipelines.

FIG. 2 illustrates a flowchart of an apparatus, method and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 16 of an apparatus 10 employing an embodiment of the present invention and executed by a processing circuitry 12 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for updating pipeline operations for data processing, the method comprising:
   receiving pipeline information corresponding to at least one pipeline of a plurality of pipelines, wherein the pipeline information includes at least one of an input dataset, output dataset, input model, intermediate model, or output model for the at least one pipeline, wherein each pipeline of the plurality of pipelines has a distinct output dataset;
   determining one or more pipelines of the plurality of pipelines to update based on similarities between the received pipeline information corresponding to the at least one pipeline of the plurality of pipelines and pipeline information for the one or more pipelines of the plurality of pipelines, wherein determining the one or more pipelines of the plurality of pipelines to update based on similarities between the received pipeline information and the pipeline information for the one or more pipelines of the plurality of pipelines comprises compiling a transitive set, wherein the transitive set comprises one or more pipelines of the plurality of pipelines to be updated together in an instance where two or more pipelines are included in the transitive set;
   updating the one or more determined pipelines of the plurality of pipelines to update based on the received pipeline information, wherein updating the one or more determined pipelines comprises updating corresponding pipeline information including at least one of an input model, intermediate model, or output model corresponding to the one or more determined pipelines; and
   storing the one or more updated pipelines.

2. The method of claim 1, wherein the one or more updated pipelines of the plurality of pipelines are stored in persistent storage.

3. The method of claim 1, wherein the similarities between the received pipeline information and the pipeline information for the one or more pipelines of the plurality of pipelines are based on at least one of a same input dataset, input model, intermediate model, or output model.

4. The method of claim 1, wherein the transitive set comprises at least two pipelines based on a previous update.

5. The method of claim 1, wherein the one or more pipelines determined to be updated include the one or more pipelines in the transitive set.

6. The method of claim 1, wherein the pipeline information is received automatically based on an observed change to one or more pipelines.

7. The method of claim 1, further comprising updating the transitive set based on the one or more updated pipelines.

8. An apparatus for updating pipeline operations for data processing, the apparatus comprising at least one processor and at least one non-transitory memory including computer program code instructions, the computer program code instructions configured to, when executed, cause the apparatus to:
receive pipeline information corresponding to at least one pipeline of a plurality of pipelines, wherein the pipeline information includes at least one of an input dataset, output dataset, input model, intermediate model, or output model for the at least one pipeline, wherein each pipeline of the plurality of pipelines has a distinct output dataset;
determine one or more pipelines of the plurality of pipelines to update based on similarities between the received pipeline information corresponding to the at least one pipeline of the plurality of pipelines and pipeline information for the one or more pipelines of the plurality of pipelines, wherein determining the one or more pipelines of the plurality of pipelines to update based on similarities between the received pipeline information and the pipeline information for the one or more pipelines of the plurality of pipelines comprises compiling a transitive set, wherein the transitive set comprises one or more pipelines of the plurality of pipelines to be updated together in an instance where two or more pipelines are included in the transitive set;
update the one or more determined pipelines of the plurality of pipelines based on the received pipeline information, wherein updating the one or more determined pipelines comprises updating corresponding pipeline information including at least one of an input model, intermediate model, or output model corresponding to the one or more determined pipelines; and
store the one or more updated pipelines.

9. The apparatus of claim 8, wherein the one or more updated pipelines of the plurality of pipelines are stored in persistent storage.

10. The apparatus of claim 8, wherein the similarities between the received pipeline information and the pipeline information for the one or more pipelines of the plurality of pipelines are based on at least one of a same input dataset, input model, intermediate model, or output model.

11. The apparatus of claim 8, wherein the transitive set comprises at least two pipelines based on a previous update.

12. The apparatus of claim 8, wherein the one or more pipelines determined to be updated include the one or more pipelines in the transitive set.

13. The apparatus of claim 8, wherein the pipeline information is received automatically based on an observed change to one or more pipelines.

14. The apparatus of claim 8, wherein the computer program code instructions are further configured to, when executed, cause the apparatus to update the transitive set based on the one or more updated pipelines.

15. A computer program product comprising at least one non-transitory computer-readable storage medium having computer-executable program code portions stored therein, the computer-executable program code portions comprising program code instructions configured to:
receive pipeline information corresponding to at least one pipeline of a plurality of pipelines, wherein the pipeline information includes at least one of an input dataset, output dataset, input model, intermediate model, or output model for the at least one pipeline, wherein each pipeline of the plurality of pipelines has a distinct output dataset;
determine one or more pipelines of the plurality of pipelines to update based on similarities between the received pipeline information corresponding to the at least one pipeline of the plurality of pipelines and pipeline information for the one or more pipelines of the plurality of pipelines, wherein determining the one or more pipelines of the plurality of pipelines to update based on similarities between the received pipeline information and the pipeline information for the one or more pipelines of the plurality of pipelines comprises compiling a transitive set, wherein the transitive set comprises one or more pipelines of the plurality of pipelines to be updated together in an instance where two or more pipelines are included in the transitive set;
update the one or more determined pipelines of the plurality of pipelines based on the received pipeline information, wherein updating the one or more determined pipelines comprises updating corresponding pipeline information including at least one of an input model, intermediate model, or output model corresponding to the one or more determined pipelines; and
store the one or more updated pipelines.

16. The computer program product of claim 15, wherein the similarities between the received pipeline information and the pipeline information for the one or more pipelines of the plurality of pipelines are based on at least one of a same input dataset, input model, intermediate model, or output model.

17. The computer program product of claim 15, wherein the transitive set comprises at least two pipelines based on a previous update.

18. The computer program product of claim 15, wherein the one or more pipelines determined to be updated include the one or more pipelines in the transitive set.

19. The computer program product of claim 15, wherein the pipeline information is received automatically based on an observed change to one or more pipelines.

20. The computer program product of claim 15, wherein the program code instructions are further configured to update the transitive set based on the one or more updated pipelines.

* * * * *